Feb. 15, 1944. J. G. VINCENT 2,341,747
CLUTCH MECHANISM
Filed Sept. 17, 1941 2 Sheets-Sheet 2
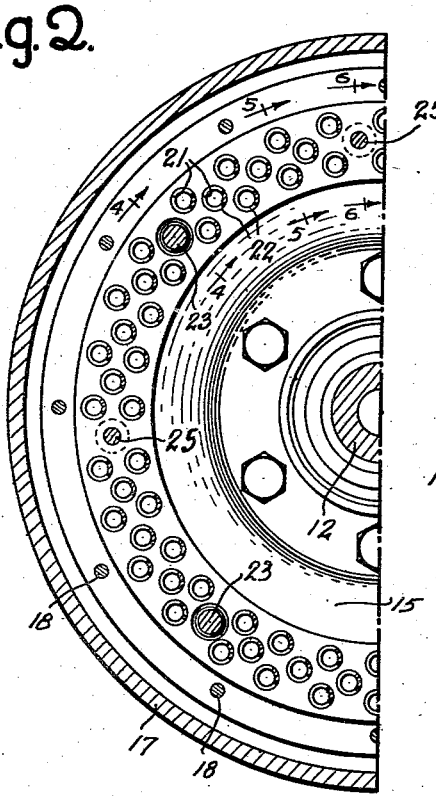
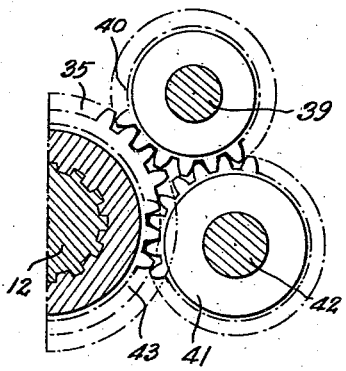
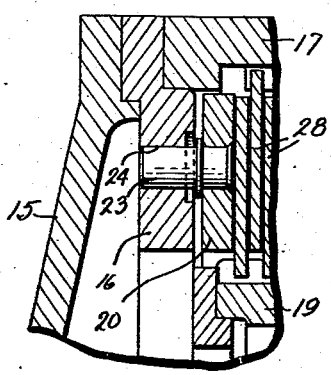
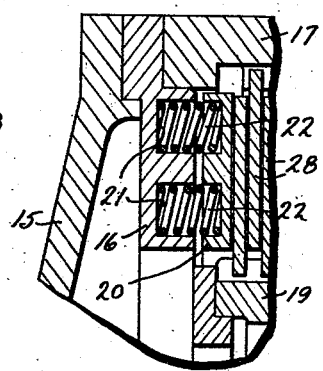
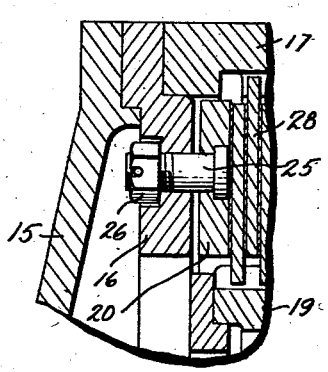
INVENTOR.
Jesse G. Vincent
BY Tibbitts + Hart
Attorneys Patented Feb. 15, 1944

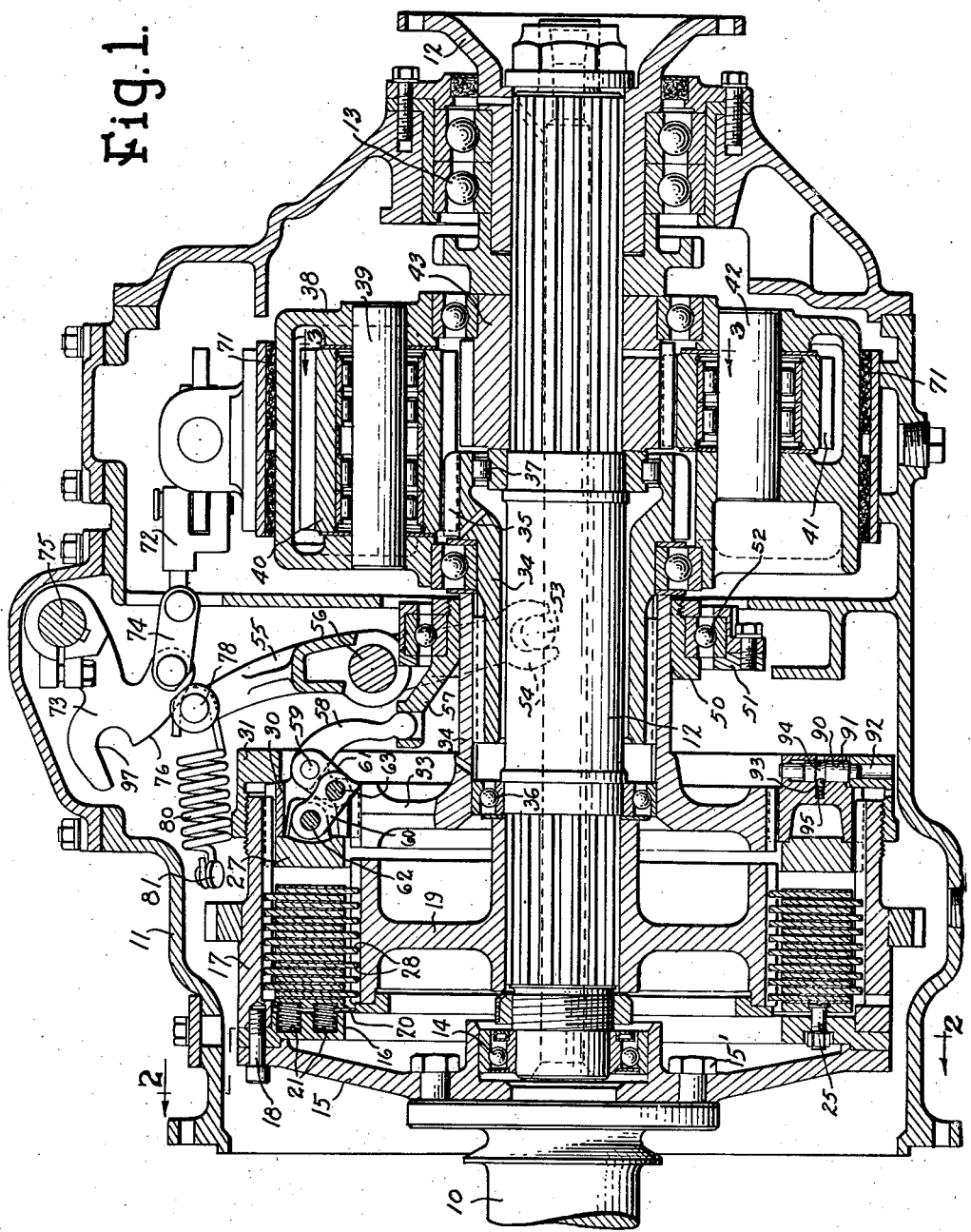

2,341,747

UNITED STATES PATENT OFFICE 2,341,747

CLUTCH MECHANISM

Jesse G. Vincent, Grosse Pointe, Mich., assignor to Packard Motor Car Company, Detroit, Mich., a corporation of Michigan Application September 17, 1941, Serial No. 411,139

6 Claims. (Cl. 192—68)

This invention relates to drive mechanism in which provision is made for establishing forward or reverse drive.

One form of drive mechanism, commonly used in boats, employs a disk clutch that is engaged to provide forward drive, and reverse gearing that is drivingly connected with the drive portion of the clutch and made effective by means of a brake. The disk clutch is controlled by toggle joints mounted to rotate with the reverse gearing, and the toggle joints and the brake are actuated by control mechanism that disengages one before applying the other.

In such control mechanism, the toggle joint means is shifted radially to move the clutch pressure plate to drivingly engage the disks. When such clutch actuating mechanism is in neutral position centrifugal force tends to throw the toggle joints into clutch engaging position and an object of this invention is to provide means for preventing this.

It has also been found that the clutch engaging force diminishes after the toggle joints pass aligned relation and another object of the invention is to provide force producing means in the clutch that compensates for such diminished force exerted by the toggle joints and for small inaccuracies in the clutch setting.

Another object of the invention is to provide for the ready adjustment of clutch actuating mechanism, of the type referred to, without disturbing the mounting of the joints.

Another object of the invention is to provide an efficient drive mechanism of the type referred to.

Other objects of the invention will appear from the following description taken in connection with the drawings, which form a part of this specification, in which:

Fig. 1 is a vertical sectional view of drive mechanism incorporating the invention;

Fig. 2 is a fragmentary sectional view of the mechanism taken on line 2—2 of Fig. 1;

Fig. 3 is another fragmentary sectional view of the mechanism taken substantially on line 3—3 of Fig. 1;

Fig. 4 is a sectional view taken on line 4—4 of Fig. 2;

Fig. 5 is a sectional view taken on line 5—5 of Fig. 2;

Fig. 6 is a sectional view taken on line 6—6 of Fig. 2.

The drive mechanism illustrated can be utilized for operating boats, vehicles, or various other power driven devices. A power or drive shaft 10 extends into casing 11 and is connected for rotation to a suitable source of power, such as an engine (not shown). Driven shaft 12 projects into the casing, in alignment with the drive shaft, and is carried in bearing 13. The drive shaft terminates in a drum consisting of a disk 15 secured to the shaft by bolts 15', a ring flange 16 and a clutch ring 17, the disk, ring flange and clutch being secured together by bolts 18. A portion of the driven shaft extends into the drum and such end is carried by the drive shaft through bearing 14. The shaft portion in the drum has a clutch hug 19 splined thereon.

A backing plate 20 is arranged in the drum adjacent ring flange 16 and the adjacent surfaces of such plate and flange are formed with a large number of registering recesses 21 in which coil springs 22 are seated. In order to readily assembly the plate and ring flange so that the recesses register and to serve as mounting and guide means for the plate, dowel pins 23 are fixed to the plate and project into openings 24 in the ring flange. The plate and ring flange are connected by bolts 25 and nuts 26 arranged to permit a limited axial movement of the plate.

The interior surface of the drum ring 17 is formed with axially extending splines that are slidably engaged by peripheral splines on clutch pressure ring 27. A plurality of clutch rings 28 are arranged intermediate the backing plate and the pressure ring and are alternately splined to the drum clutch ring and the clutch hub. Springs 22 urge the clutch rings 28 toward pressure ring 27 and thus compensate for manufacturing and assembly inaccuracies that would otherwise vary the effectiveness of the engaging movement of the pressure ring.

When the pressure ring engages the clutch rings, they serve to drivingly engage the shafts 10 and 12 so that direct forward drive will result. The shaft 12 is driven in reverse from shaft 10 through gearing that is connected with the drum by coupling means consisting of a ring 30 that is adjustably splined to the drum ring adjacent pressure ring. The maximum position of the pressure ring from the backing plate can be determined by the position of the coupling ring as controlled by cap 31 screwed on ring 17 and this distance can be varied upon adjustment of the cap.

The coupling ring 30 is splined to the periphery of a hub 33 on a section of sleeve 34 and on the other section of such sleeve is formed a gear 35. The sleeve is rotatably carried on shaft 12 by bearings 36 and 37 and the sections of the sleeve are splined together. A carrier 38 encircles the driven shaft and supports a plurality of pins 39 on which gears 40 are rotatably mounted. These gears 40 mesh with gear 35 and with other gears 41 rotatably mounted on pins 42 secured to the carrier. Gears 41 mesh with gear 43 splined on the driven shaft. There is thus a driving connection between the clutch drum and the driven shaft which free wheels when the carrier 38 is free to rotate. When the carrier is held or braked, the shaft 12 is driven reversely from shaft 10 through the gearing 35, 40, 41 and 43.

Mechanisms are provided for controlling the clutch and the carrier and are arranged to be selectively made effective preferably by a single actuating mechanism.

The clutch controlling mechanism consists of ring members 50 and 51 having bearing balls 52 therebetween, the outer ring member 51 having trunnions 53 thereon engaged by fork arms 54 of a shift lever 55 pivotally mounted on shaft 56 fixed in the casing. The inner ring member 50 is slidably mounted on sleeve 34 and rotates therewith. The inner ring member is provided with a plurality of arms, as designated by numeral 57, each having a recess in which a lever 58 is pivotally mounted. The levers 58 are fixed to pins 59 rotatably mounted on coupling ring 30 and between each pin and the clutch pressure ring is arranged a toggle joint consisting of links 60 and 61. Link 60 is connected by pin 62 to the pressure ring, link 61 is fixed to pin 59 and the adjacent ends of the links are pivotally connected by pin 63. The coupling ring acts as an anchor for the toggle joints and the joints are moved radially outwardly to increase the distance between pins 59 and 62 and thereby shift the pressure ring axially to engage or release the clutch rings 28. The pivot 63 thus normally lies inside of a center line through pins 59 and 62 and the coupling ring is hollowed out to receive the toggle joints and to permit them to function.

The drive mechanism is in reverse drive position as shown in Fig. 1. The disk clutch is disengaged and mechanism for holding the carrier 38 is applied. This mechanism can be a conventional brake mechanism in which band sections 71 are anchored to the casing 11 and applied to or released from the carrier by suitable control mechanism, as indicated by numeral 72.

The brake control mechanism is connected to an actuator 73 by link 74 and this actuator is fixed on shaft 75 mounted in the casing and adapted to be rocked by a suitable handle (not shown) exteriorly of the casing. Clockwise rocking of shaft 75, as viewed in Fig. 1, will engage the brake mechanism to hold the carrier stationary. The actuator has a cam surface 76 terminating at one end in a recess 97. On the lever 55 is a pin 78 that rides on the cam surface except when engaged in the recess 97. While the pin is riding on the cam surface the clutch will be disengaged because no motion is imparted to the clutch operating mechanism by the actuator. When pin 78 is in recess 97 the shift lever 55 will be rocked by rotation of actuator 73 and when shaft 75 is rocked counterclockwise the arms 58 will be shifted to cause the toggle joints to move the pressure ring into clutch engaging position. Means is provided to oppose this engaging movement of the toggle joints and can take the form of a coil spring 80 having one end fastened to a boss 81 on the inside of the casing and the other end fastened to pin 78 on lever 55. This spring pulls the top of lever 55 to the left with sufficient force to effectively oppose any centrifugal force tending to move the toggle joints from position in which the disk clutch is disengaged. The springs 22 serve to take up pressure loss in the toggle joints after the pins 63 move radially beyond lines through the pins 59 and 62.

The clutch pressure ring and coupling ring can be shifted axially in the drum upon adjustment of cap 31 without disturbing the assembly of the pressure ring operating mechanism. The cap is locked by readily displaceable means while an adjustment of the cap is being made. The coupling ring is formed with radially extending openings 90 in which latch pins 91 are slidably mounted. The cap has a plurality of openings 92 for receiving an end of the latch pins. Detents 93 are carried by the coupling ring for engaging grooves 94 in the latch pins when projected into openings in the cap and such detents are backed by springs 95. When an adjustment of the coupling ring is desired, the latch pins are pushed out of the cap opening inwardly of the casing and the cap can thus be moved to permit coupling ring adjustment. The springs will exert sufficient pressure on the detents to hold them disengaged from the cap until pushed back into latching position.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a drive mechanism, a casing, a drive shaft extending into the casing, a driven shaft extending into the casing, a friction clutch in the casing shiftable to drivingly connect said shafts, said clutch including a pressure ring fixed to rotate with the drive shaft, an anchor ring adjacent the pressure ring and fixed to rotate with the drive shaft, toggle joints between and anchored to said rings, mechanism operable to shift said toggle joints to engage the pressure ring, and a coil spring anchored to said casing and said mechanism in a relation biasing the effort of centrifugal force acting to shift said toggle joints toward clutch engaging position.

2. In a drive mechanism, a drive shaft having an interiorly splined drum, a driven shaft having a clutch hub splined thereto within the drum, a pressure ring slidably splined to the drum, a coupling drive ring splined to the drum adjacent the pressure ring, toggle joints anchored to the pressure ring and drive ring, means for actuating said toggle joints to shift said pressure ring, a retainer member for the drive ring screwed on an end of the drum, and releasable latch means carried by said drive ring engaging said retainer member, said retainer member being rotatable for adjustment on said drum while said latch means is released from said drum.

3. In a drive mechanism, a drive shaft having an interiorly splined drum, a driven shaft having a splined clutch hub within the drum, a pressure ring slidably splined to the drum, a coupling drive ring splined to the drum adjacent the pressure ring, toggle joints anchored to the pressure ring and drive ring, means for actuating said toggle joints to shift said pressure ring, a retainer member for the drive ring screwed on an end of the drum, a slidable pin engaging said drum and said retainer member, and a detent in said drum adapted to retain said pin in interlocking relation with said drum and said retainer member.

4. In a drive mechanism, a drive shaft having an interiorly splined drum, a driven shaft having a splined hub within the drum, a pressure ring slidably splined to the drum, a coupling drive ring splined to the drum adjacent the pressure ring, toggle joints anchored to the pressure ring and drive ring, means for actuating said toggle joints to shift said pressure ring, a retainer member for the drive ring screwed on an end of the drum, an interlock pin slidable in said drum and engageable with said retainer member, a detent in said drum adapted to retain said pin in interlocking relation with said drum and said retainer member, and a spring in said drive ring urging said detent into engagement with said pin.

5. In a drive mechanism, a casing, a drive shaft extending into the casing, a driven shaft extending into the casing, a friction clutch device in the casing shiftable to drivingly connect said shafts, said clutch device including a pressure ring fixed to rotate with the drive shaft, an anchor ring adjacent the pressure ring connected to rotate with the drive shaft, toggle joint means between and anchored to said rings, a shift lever operable to actuate the toggle joint means to engage said clutch device, and spring means arranged between the casing and the lever in relation to oppose the effort of centrifugal force acting to shift said toggle joint means toward clutch engaging position.

6. In a drive mechanism, a casing, a drive shaft extending into the casing, a driven shaft extending into the casing, a friction clutch in the casing shiftable to drivingly connect said shafts, said clutch including a pressure ring fixed to rotate with the drive shaft, an anchor ring adjacent the pressure ring and fixed to rotate with the drive shaft, toggle joint means between and secured to said rings, shiftable means for actuating said toggle joint means, a lever pivoted in the casing for actuating said shiftable means, said lever having a pin fixed thereto, cam means engaging said pin to rock the lever, and a coil spring anchored to the casing and looped over said pin, said coil spring being arranged to oppose the effort of centrifugal force acting to shift said toggle joint means toward clutch engaging position.

JESSE G. VINCENT.